Sept. 8, 1970  W. H. LAKE  3,527,982
DISCHARGE LAMP BALLASTING
Filed July 31, 1968  2 Sheets-Sheet 1

Inventor:
William H. Lake
by Ernest W. Legree
His Attorney

Low Wattage High Pressure Hg Lamp

High Wattage High Pressure Hg Lamp

United States Patent Office 3,527,982
Patented Sept. 8, 1970

3,527,982
DISCHARGE LAMP BALLASTING
William H. Lake, Novelty, Ohio, assignor to General Electric Company, a corporation of New York
Continuation-in-part of application Ser. No. 524,110, Feb. 1, 1966. This application July 31, 1968, Ser. No. 757,180
Int. Cl. H05b 37/00
U.S. Cl. 315—200                                11 Claims

ABSTRACT OF THE DISCLOSURE

A hybrid rectifier-capacitor bridge formed of two branches each comprising a rectifier and a capacitor connected in series across alternating current input terminals and a bypass rectifier connected across the capacitor. The series rectifiers conduct in opposite directions in the two branches; each bypass rectifier is poled to conduct in opposite directions to the series rectifier in the same branch. The utilization circuit including a discharge lamp and which may also include a series ballasting impedance is connected across the junction points of the series rectifier and capacitor in the two branches. A dual envelope high intensity lamp specially adapted for operation in this circuit includes a filament in the interenvelope space connected in series with the arc tube, the filament having a resistance at operating temperature not exceeding ⅓ the equivalent arc tube resistance.

BACKGROUND OF THE INVENTION

This invention relates to a new ballasting or current-regulating circuit which uses a hybrid rectifier-capacitor bridge circuit for operating discharge lamps on rectified alternating current at high efficiency. This application presents an improvement over my Pat. 3,233,148, "Discharge Lamp Ballasting Circuit," and is a continuation-in-part of my copending application Ser. No. 524,110, filed Feb. 1, 1966, similarly entitled and assigned, and now abandoned.

In my above patent I have described and claimed a new type of ballast for electric discharge lamps which is designated a rectifier-capacitor bridge ballast. It is similar in its wiring configuration to the voltage doubler circuit heretofore used in electronic equipment as a low-cost transformerless power supply providing a D.C. voltage at approximately twice the A.C. line voltage but is proportioned to operate in a radically different fashion. In the conventional voltage doubler circuit, the desired output is a D.C. voltage with minimum pulsation and efficiency is not important. In the rectifier-capacitor bridge, the discharge device or lamp load operates on unidirectional rectified current having a very high ripple factor. Current flow through the lamp results not only from the discharging but also from the charging of the capacitors of the bridge. The lamp current has a very pronounced alternating component having a fundamental frequency of twice the line frequency superimposed on the unidirectional component. This mode of operation is made possible because the discharge lamp provides a load operable in two different impedance states with a voltage-sensitive transition point and it results in transfer of energy to the lamp load at high efficiency.

In the rectifier-capacitor bridge of my patent, the voltage across the capacitors reverses cyclically in polarity at the line frequency. This entails that nonpolarized or A.C. type capacitors must be used. An object of this invention is to provide an improved circuit which does not require a nonpolarized capacitor and permits the use of electrolytic capacitors so that smaller, lighter weight and less expensive components may be utilized.

Another object of the invention is to provide an improved rectifier-capacitor circuit which permits the use of a degree of resistance ballasting at high efficiency by causing the bridge output voltage waveform to approximate closely the lamp voltage waveform, that is the lamp arc drop, over a portion of the cycle.

SUMMARY OF THE INVENTION

An improved ballast circuit according to my invention is a hybrid rectifier-capacitor bridge formed of two branches each comprising a rectifier and a capacitor connected in series across alternating current input terminals and a bypass rectifier connected across the capacitor. The series rectifiers are poled for conduction in opposite directions in the two branches; each bypass rectifier is poled to conduct in opposite direction to the series rectifier in the same branch. The utilization circuit which includes the electric discharge device or lamp and which may also include a series ballasting impedance is connected across the junction points of the series rectifier and capacitor in the two branches. The utilization circuit during at least a portion of the alternating current cycle receives energy from the input terminals directly through the rectifiers, the current flow being through a series rectifier of one branch and a bypass rectifier of the other.

An outstanding advantage of my invention is that the degree of additional ballasting or partial current regulation which need be provided by means of an impedance inserted in series between the line terminals and the lamp, is relatively minor. The energy expended in such impedance is generally less than ⅓ of the energy expended in the lamp, and this is the case when the lamp power factor is high; in any event, it is less than ⅓ of the total energy supplied to the system. Therefore it is entirely feasible to use for the purpose a resistance and yet maintain the overall efficiency equal to or above that achieved with the conventional reactance ballast. The resistance of such filament is generally less than ⅓ the equivalent resistance of the lamp determined by the formula:

$$R_{eq} = V^2/W$$

where $R_{eq}$ = equivalent resistance,
V = voltage (R.M.S.) across lamp,
W = wattage consumed in lamp.

To achieve the foregoing, certain lamp characteristics must be matched to the system including the A.C. power supply. The lamp should have a volt-ampere characteristic such that the instantaneous arc drop across it is less than the instantaneous line voltage over a portion of a cycle sufficient for a substantial proportion of input energy to the lamp, at least 10% and preferably more, to be transmitted directly from the line terminals through the rectifiers during such portion. At such time, current flow is through the series rectifier of one branch and the bypass rectifier of the other branch on one half cycle, and through the series rectifier of the other branch and the bypass rectifier of the one branch on the other half cycle. The ballasting impedance need only absorb the difference between instantaneous line voltage and instantaneous arc drop. The lamp is selected so that such difference is small; therefore the ballasting impedance or resistance is low in value and the losses in it are likewise low. In general the ballasting impedance is so proportioned in respect of line voltage and lamp arc drop that rated power is delivered to the lamp and the losses do not exceed ⅓ of the input to the lamp, or in any event ⅓ of the total input to the system.

The ballasting impedance should be so connected in the bridge circuit that the lamp current flows through it when the input energy is transmitted directly from the line terminals through the rectifiers. This offers a choice of several places where the ballast impedance may be connected in the circuit. The most convenient one is that wherein the ballast resistance is located directly in series with the lamp across the output terminals of the bridge. However it may also be connected in series with the input terminals to the bridge across the line terminals.

With certain types of lamps such as jacketed high pressure metal vapor lamps, the ballasting impedance may conveniently be provided as resistance in the form of a filament located in the interenvelope space between the arc tube and inner jacket. This means that the filament can provide light immediately at start-up and also warm-up of the lamp is quickened. The filament will of course be of much lower resistance than in conventional resistance-ballasted mercury vapor lamps intended for direct operation across the line without the hybrid rectifier-capacitor bridge circuit of my invention. Some lamps, particularly high intensity metal vapor lamps, experience a large increase in voltage drop as the vapor pressure builds up during warm-up. In such lamps, part and in some cases all of the filament may be shorted out during normal operation, and the portion of the ballasting filament which remains effectively in series with the arc tube is so proportioned in respect of line voltage and normal lamp arc drop that rated power is delivered to the lamp. Such filament portion is generally less than ⅓ the equivalent resistance of the arc tube, and preferably less than one-tenth.

The capacitors of the bridge have a value sufficient to supply enough current to the discharge to maintain residual ionization in the lamp throughout the interval in each half cycle when line voltage falls below arc-sustaining voltage. At the beginning portion of each half cycle, the voltage doubling effect of the capacitors causes a build-up in voltage substantially above the instantaneous line voltage. It is this excess in voltage which causes the ionization in the lamp to build-up rapidly again to the point where the instantaneous arc drop falls below the instantaneous line voltage whereupon current flow takes place directly through the rectifiers in the mid-portion of the half cycle. In the terminal portion of the half cycle, the capacitors provide current to maintain residual ionization and permit a repeat of the build-up at the next half cycle.

DESCRIPTION OF THE DRAWINGS

In the drawings wherein like reference characters indicate corresponding elements in the several views.

DESCRIPTION OF THE PREFERRED EMBODIMENTS

Figure 1:
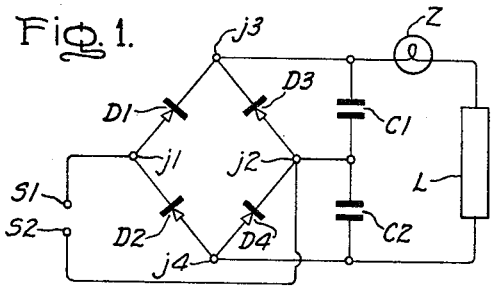
FIG. 1 is a schematic diagram of the basic hybrid rectifier-capacitor bridge ballasting circuit of the invention for operating a discharge lamp.

The hybrid rectifier-capacitor bridge circuit shown in FIG. 1 is formed of two branches each comprising a series rectifier and a capacitor connected in series between input junction points $j1$, $j2$, and a bypass rectifier shunting the capacitor. The series rectifiers are poled for conduction in opposite directions in the two branches. The bypass rectifier in each branch is poled to conduct in opposite direction to the series rectifier in the same branch. As illustrated, the A.C. line voltage at terminals S1, S2 is supplied to input junctions $j1$, $j2$; one branch comprises series rectifier D1 and capacitor C1, D1 being poled to permit current flow from junction $j1$; the bypass rectifier D3 is poled oppositely to the series rectifier D1. The other branch comprises series rectifier D2 and capacitor C2 wherein D2 is poled to permit current flow towards junction $j1$; the bypass rectifier D4 is poled oppositely to the series rectifier D2 in the same branch. The rectifiers are preferably high efficiency semiconductive diodes such as silicon diodes and the capacitors may be of a polarized or electrolytic type. The circuit may also be described as a full-wave bridge rectifier with a pair of capacitors connected between the conjugate output points and one of the input points.

The junction points of the series diode and capacitor in each branch, namely $j3$ and $j4$ referred to as the conjugate points, form the output points across which the utilization or load circuit is connected. The load circuit comprises the load proper L and optionally a ballast impedance Z connected in series with it to provide a minor degree of additional current regulation. The load proper L is a discharge lamp which inherently has a negative impedance characteristic in its high conduction state. Since the series impedance Z need provide only partial current regulation, it is entirely feasible to use for it a tungsten filament which may be a separate incandescent lamp or, alternatively, a part of the discharge lamp unit.

Figure 2A:
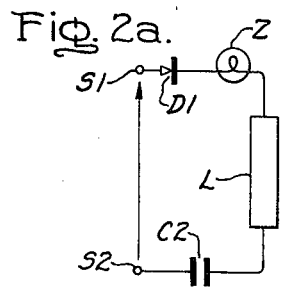
FIGS. 2a, b and c are equivalent circuit diagrams of the circuit of FIG. 1 during various portions of the A.C. cycle.
Figure 2B:
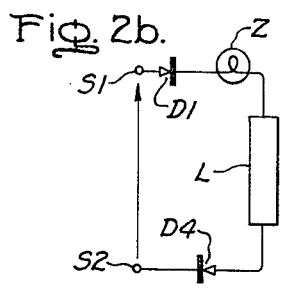
Figure 2C:
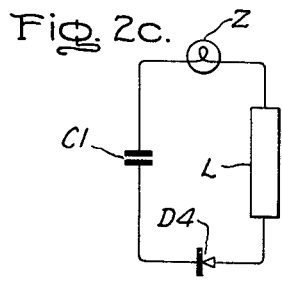

FIGS. 2a, 2b and 2c are equivalent circuits illustrating conditions in the hybrid bridge circuit of FIG. 1 during various portions of the half cycle wherein the A.C. voltage applied to terminal S1 is positive, the polarity being conventionally indicated by the arrow. During the initial portion of the half-cycle, D1 is forward biased, D2, D3 and D4 are reverse biased and current flows through C2. Letting $(V_{C2})_0$ represent the residual charge on C2 at the beginning of the positive half cycle, $V_d$ the instantaneous voltage across lamp L, $i$ the instantaneous lamp current, and $E \sin wt$ the instantaneous applied voltage, conditions may be expressed by the following equation:

$$E \sin wt = iZ + V_d + \frac{1}{C}\int i\, dt - (V_{C2})_0$$

During this portion of the cycle, the current through the lamp is controlled by capacitor C2, namely the capacitor in the other branch.

In the next portion of the cycle, D1 and D4 are forward biased, D2 and D3 are reverse biased, $V_d$ is less than $E \sin wt$, and conditions are expressed by the following equation:

$$E \sin wt = iZ + V_d$$

During this portion of the cycle, the lamp receives energy directly from the line through two rectifiers, one being the series rectifier in one branch and the other being the bypass rectifier in the other branch. It is only during this portion of the cycle that the ballast impedance, if used, is effective.

In the final portion of the cycle, D4 is forward biased, D1, D2 and D3 are reverse biased. Letting $(V_{C1})_1$ represent the charge on $C_1$ at the moment when $V_d$ becomes greater than $E \sin wt$, conditions may be represented by the following equation.

$$V_d + iZ + \frac{1}{C}\int i\, dt - (V_{C1})_1 = 0$$

During this portion of the cycle, the lamp receives its energy from capacitor C1 in the one branch and it is passed through bypass rectifier D4 in the other branch.

For minimum ballast losses and maximum efficiency, it is desirable to operate with a lamp voltage which is close to the supply voltage. Some of the current then is derived directly from the line and flows to the lamp through the series rectifier of one branch and simultaneously through the bypass rectifier of the other branch and little ballast impedance is needed. The advantages to this approach are improved power factor compared to all capacitive ballasting, and improved efficiency compared to conventional impedance ballasting, particularly when compared to the case where the conventional impedance is provided in the form of resistance.

Figure 4:
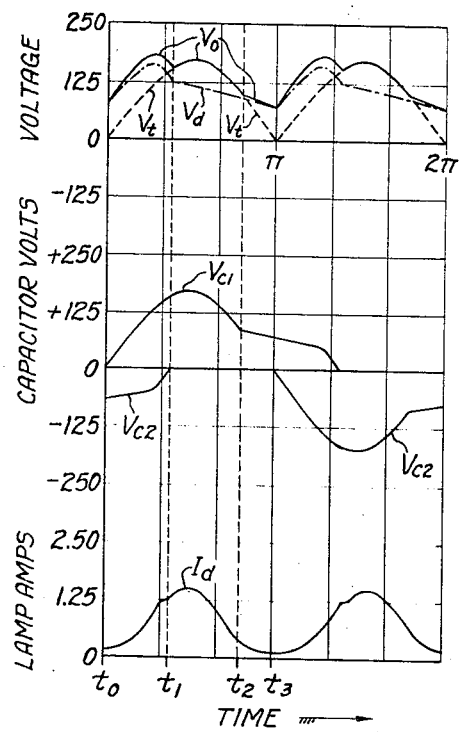
FIG. 4 gives waveforms of lamp voltage, capacitor voltage, and lamp curernt for a hybrid rectifier-capacitor bridge circuit embodying the invention and intended for a high voltage, low wattage discharge lamp.
Figure 5:
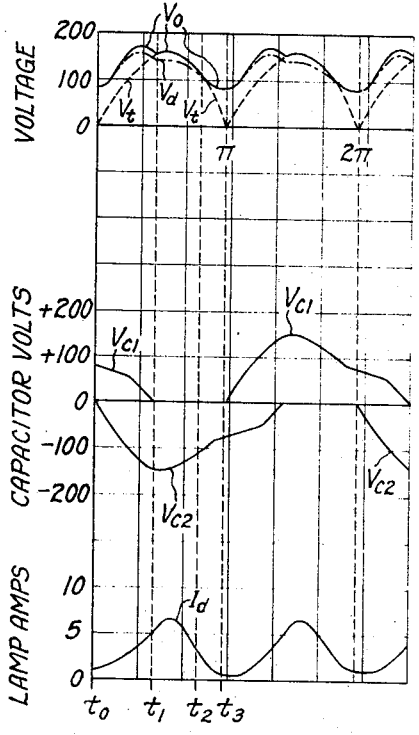
FIG. 5 gives similar waveforms for another hybrid rectifier-capacitor bridge intended for a high voltage, high wattage discharge lamp.

The advantage of selecting lamp characteristics such that the arc drop over a half cycle of the A.C. wave is as close as possible to the line supply voltage may be seen by comparing the curves of FIGS. 4 and 5.

FIG. 4 relates to a circuit according to the invention opearting a low wattage high pressure mercury lamp with the following system characteristics:

Line voltage: 118 volts
Line current: 0.85 amp
Input power factor: 85%
Capacitors: 12 mfd.
Ballast resistance: 37 ohms
Arc voltage drop: 108 volts
Lamp current: 0.6 amp
Lamp input: 66 watts
Overall efficiency: 70%

Solid line curve $V_0$ represents the output voltage at the bridge terminals excluding the ballast resistance, that is at conjugate points $j3$, $j4$. Dot-dash curve $V_d$ represents the voltage drop measured across the arc tube terminals. Dotted line portions $V_t$ are the sinusoidal extensions of the output voltage $V_0$ during the initial portion of the half cycle from time $t_0$ to $t_1$, and during the final portion of the half cycle from time $t_2$ to $t_3$. During the intermediate portion of the half cycle from $t_1$ to $t_2$ the bridge output voltage $V_0$ coincides with the line voltage. Dotted line portions $V_t$ when combined with $V_d$ over the time interval from $t_2$ to $t_3$ constitute in effect the sinsoidal A.C. line voltage. During time interval $t_2$ to $t_3$, the lamp receives energy directly from the line through the two rectifiers. During this portion of the half cycle, the ballast resistance absorbs the difference between the instantaneous line voltage $V_0$ and the instantaneous arc drop $V_d$. In the circuit of FIG. 4, this difference is appreciable; a ballast resistance of 37 ohms is required to absorb it and this entails an overall efficiency of 70%. During the time interval $t_1$ to $t_2$, lamp current $I_d$ is relatively high and the product of this current by the arc drop $V_d$ during such time represents energy transmitted to the lamp directly from the line terminals through the rectifiers.

During the initial portion of the half cycle from time $t_0$ to $t_1$, the voltages across the capacitors $V_{C1}$ and $V_{C2}$ are additive in their effect and assure a rapid build-up of ionization in the lamp. During the terminal portion of the half cycle from $t_2$ to $t_3$, one of the capacitors supplies current to maintain residual ionization.

FIG. 5 relates to another circuit according to the invention operating a high wattage high pressure mercury lamp with the following characteristics:

Line voltage: 118 volts
Line current: 4.3 amps
Input power factor: 85%
Capacitors: 90 mfd.
Ballast resistance: 3 ohms
Arc voltage drop: 125 volts
Lamp current: 3 amps
Lamp input: 404 watts
Overall efficiency: 90%

The closer match between bridge output voltage $V_0$ and lamp arc drop $V_d$ over the time interval $t_1$ and $t_2$ is apparaent. Since the ballast resistance need only take care of the very small voltage difference remaining, in this case 3 ohms is sufficient and assures stability in operation resulting in an overall ballast efficiency of 90%. The current $I_d$ during the time interval from $t_1$ to $t_2$ is high by comparison with the current over the remaining portions of the cycle so that much in excess of 10% of the input energy to the lamp is transmitted directly from the line terminals through the rectifiers during this time interval.

In the circuit of FIG. 5, the arc drop voltage represented by $V_d$ is that present after the arc tube has warmed up and the metal filling (mercury) has developed its maximum vapor pressure. However in high pressure metal vapor lamps, a much lower value of arc drop exists immediately at starting and during the process of warming up. A larger ballasting impedance must be provided to assure stability during this interval, but it may be shorted out after the lamp has arrived at temperature as in the lamp and ballast combination of FIGS. 3 and 3a to be described.

The essential function of the ballasting impedance is to limit the current through the lamp when current flows from the line to the lamp directly through the rectifiers. Its location in the circuit is not critical so long as it fulfills this function. Therefore the ballasting impedance may be a resistance placed in series with the lamp in the utilization circuit across the conjugate points $j3$, $j4$ of the bridge as shown in FIG. 1. Alternatively, the ballasting resistance may be placed in series with the bridge input terminals $j1$, $j2$ across the line terminals S1, S2. In the latter case, the ballast resistance limits the current to the lamp in essentially the same fashion during the time interval $t_1$ to $t_2$ when current flows directly through the rectifiers. The efficiency would be reduced slightly, however, because current flow to the capacitors during time intervals $t_0$ to $t_1$ and $t_2$ to $t_3$ would also be compelled to pass through the ballasting resistance. However there are circuit applications where the greater convenience of such a conenction more than offsets the slight loss in efficiency.

Figure 3:
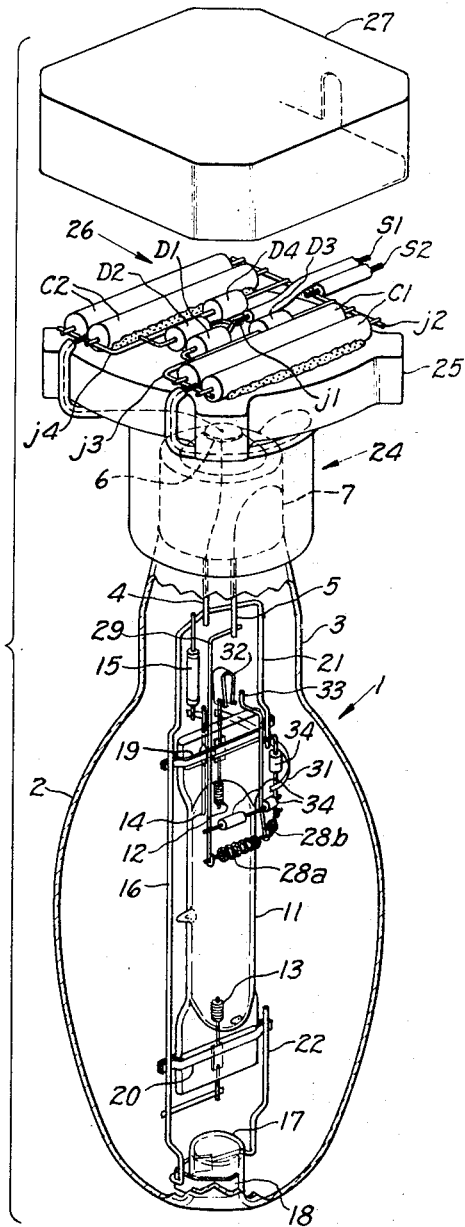
FIG. 3 illustrates a practical high pressure mercury vapor lamp and ballast combination using partial resistance ballasting.
Figure 3A:
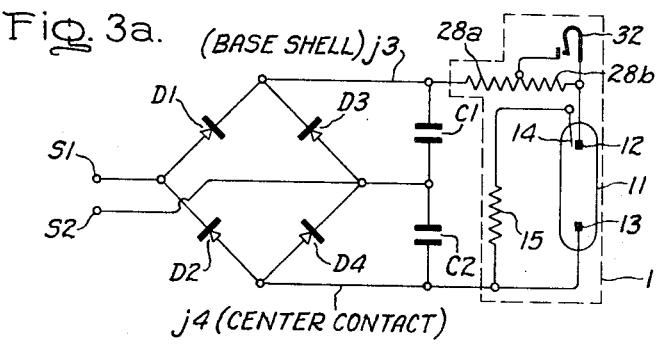
FIG. 3a shows schematically the circuit connections.

A lighting unit, that is a ballast and lamp combination, embodying the invention and optimized for high efficiency together with low cost and small weight and bulk is illustrated in FIG. 3, and the circuit connections may readily be followed in the schematic diagram of FIG. 3a which is identically referenced. The lamp 1 proper corresponds generally to a 400-watt high pressure mercury vapor lamp designated commercially H400A33–1, but it has a ballasting resistance added which adapts it especially for use with a hybrid rectifier-capacitor bridge. In FIG. 3a, the lamp proper is the portion enclosed within dashed rectangle 1. The lamp comprises an outer vitreous envelope or jacket 2 of ovoid shape and fabricated of soft glass. The neck 3 of the outer envelope is closed by the usual re-entrant stem through which extend relatively stiff inlead wires 4, 5 the former being connected to the insulated center contact 6 and the latter to the threaded shell 7 of the base which may be of the conventional screw type. The inner arc tube 11 of quartz is provided at opposite ends with a pair of main discharge-supporting electrodes 12, 13 on ribbon-type inleads pinch-sealed through the flattened ends of the tube. Each electrode comprises a double tungsten wire helix activated with an electron-emitting mixture of alkaline earth oxides. An auxiliary starting electrode 14 is provided at the base end of the arc tube and is connected to main electrode 13 at the opposite end of the arc tube through the usual current limiting resistor 15. The arc tube is supported within the jacket or outer envelope by means of a single side rod harness 16 which extends from inlead 4 to an anchoring dimple 17 at the domed end of the jacket which is engaged by a springy clamp 18. The arc tube is supported in the harness by clamping its flat ends between metal bands 19, 20 which extend between side rod 15 and complementary end portions 21, 22. Side rod 15 serves as a conductor which connects main electrode 13 to inlead 4 which in turn connects to the center contact 6 of the base. The arc tube contains a charge of mercury and an inert gas such as argon at a pressure below 100 millimeters of mercury.

The lamp is shown engaged in a conventional screw type socket 24 having a pedestal portion 25 on whose upper surface the components of a hybrid rectifier-capacitor bridge 26 are mounted. For ease of correlation, the elements and junctions of the bridge have been given the same reference characters as in the schematic diagram of FIG. 1. The components are mounted in a cluster on the top surface of the pedestal 25 so that the entire assembly 26 occupies a volume which fits readily into a common electrical wiring box diagrammatically indicated at 27. Each of the capacitors C1, C2 is made up of a pair of extended range electrolytics mounted side by side in the outermost positions on the pedestal 25; the semiconductor diodes D1 to D4 are centrally grouped together between the capacitors.

The ballasting impedance Z is provided in the form of a tungsten filament 28 as part of the lamp proper; it is located in the lamp within the inter-envelope space between outer jacket 3 and arc tube 11. The filament is in two portions 28a, 28b permanently connected in series between an extension 29 of inlead 5 and the inlead of main electrode 12 by means of strap 31. At starting and during the warm-up period, both filament sections 28a and 28b are connected in series with the lamp across the conjugate output points j3, j4 of the bridge. The current is thus effectively limited and at the same time useful light is produced by the filament and the warm-up of the arc tube is speeded up. As the lamp warms up and the vapor pressure in the arc tube increases, it is desirable to cut out a portion of the filament. This is accomplished by U-shaped bimetal strip 32 which is mounted on the inlead of electrode 12 with its free end disposed to engage conductor 33 which provides a circuit connection to the junction of filament portions 28a and 28b. Section 28b is thus shorted out and only section 28a of the filament remains effectively in series with the arc tube during normal operation of the lamp. The glass beads 34 isolate structural supports for the two filament sections.

The design data and performance characteristics of the lighting unit of FIG. 3 operated on a 117.5 v., 60 cycle A.C. supply are given in the following table. The voltage and current curves of FIG. 5 apply quite closely to this lamp-ballast combination.

| | |
|---|---|
| Lamp volts | 130 v. (nominal). |
| Lamp current | 2.8 a. avg. D.C. |
| Capacitance | 2–50 µf./150 v. |
| Diodes | 4–IN4142. |
| Ballast filament | Corresponding to a 1000 w., 115–120 v. lamp. |
| Bimetal switch | 20 v., 3 amp. |
| Ballast eff. | 95%. |
| Power factor | 88%. |
| Volume | 2.0 cu. in. |
| Weight | 5 oz. |

The equivalent resistance of the arc tube is about 40 ohms and the equivalent resistance of the filament is about 12 ohms when both sections are operating in series. The remaining resistance of section 28a when section 28b is shorted out is about 3 ohms at the operating temperature, which is less than $1/10$ of the equivalent arc tube resistance. While resistance ballasting is provided in the lighting unit of FIG. 3, it is secondary in its current regulating effect to the hybrid bridge proper. This is what permits an efficiency of 95% which is in the efficiency range of conventional reactive type ballasts. The combination mercury discharge-incandescent lamps heretofore used have had ballast efficiencies in the range of 50% and the units of the present invention are in a completely different class.

The lamp of FIG. 3 is specially designed with an effective filament resistance of less than $1/3$ the equivalent arc tube resistance for operation in a hybrid rectifier-capacitor bridge. The lamp would probably not start on the usual 115–120 volt A.C. supply. However were the lamp connected directly across a line having a voltage high enough to start the discharge, the filament would burn up immediately. Of course the illustrated lamp and ballast may also be physically joined as an integral unit for direct connection across a 115–120 v. 60 cycle A.C. line like an incandescent lamp.

While the invention is particularly advantageous when used with dual envelope high-pressure vapor lamps wherein the ballast filament for minor regulation may be mounted in the inter-envelope space, the principles of the invention are broadly applicable to any kind of electric discharge lamp having a negative resistance characteristic. The specific embodiments of the invention which have been described in detail herein are intended of course as exemplary and the scope of the invention is to be determined by the appended claims.

What I claim as new and desire to secure by Letters Patent of the United States is:

1. An operating circuit for an electric discharge lamp comprising a hybrid rectifier-capacitor bridge having a pair of branches each including a rectifier and a capacitor connected in series across alternating current line terminals, the rectifiers being poled for conduction in opposite directions in the two branches,
   a bypass rectifier connected across each capacitor and poled to conduct in opposite direction to the series rectifier in the branch,
   a utilization circuit comprising an electric discharge lamp connected across the junction points of the series rectifier and capacitor in the two branches,
   and a ballasting impedance inserted in series between the line terminals and the lamp,
   said lamp having a volt-ampere characteristic such that the instantaneous arc drop across it is less than the instantaneous line voltage over a portion of a cycle sufficient for at least 10% of input energy to the lamp to be transmitted directly from the line terminals through the rectifiers during such portion,
   said capacitors having a value sufficient to supply enough current to the discharge to maintain residual ionization in the lamp throughout the interval in each half cycle when line voltage falls below arc-sustaining voltage,
   said ballasting impedance being proportioned in respect of line voltage and average lamp arc drop so that rated power is delivered to the lamp and the losses do not exceed $1/3$ of the total input.

2. A circuit as defined in claim 1 wherein the ballasting impedance is connected in series with the electric discharge lamp across the junction points of the series rectifier and capacitor in the two branches.

3. A circuit as defined in claim 2 wherein the ballasting impedance is a resistance which is less than $1/3$ the equivalent resistance of the discharge lamp.

4. A circuit as defined in claim 2 wherein the ballasting impedance is a resistance which is not more than about $1/10$ the equivalent resistance of the discharge lamp.

5. A circuit as defined in claim 1 wherein the electric discharge lamp is a dual envelope lamp comprising a high pressure metal vapor arc tube having electrodes sealed therein and an outer envelope in which the arc tube is mounted, said ballasting impedance being located in the interenvelope space.

6. A circuit as defined in claim 5 in which the ballasting impedance is a filament mounted in the interenvelope space.

7. A dual envelope electric discharge lamp for operation across the output terminals of a hybrid rectifier-capacitor bridge having a pair of branches each including a rectifier and a capacitor connected in series between alternating current input terminals, the rectifiers being poled for conduction in opposite directions in the two branches and a bypass rectifier connected across each capacitor and poled to conduct in opposite direction to the series rectifier in the branch, the junction points of the series rectifier and capacitor in each branch being the output terminals, said lamp comprising a metal vapor arc tube having electrodes sealed therein mounted in an outer envelope having terminals sealed therethrough, and a resistive filament in the interenvelope space connected a series with the arc tube electrodes between said terminals, said filament having a resistance at operating temperature not exceeding ⅓ the equivalent arc tube resistance.

8. A lamp as defined in claim 7 including a switch arranged to short out a portion of the filament after warm-up and retain in series circuit with the arc tube a portion having a resistance at operating temperature not exceeding ⅓ the equivalent arc tube resistance.

9. A lamp as defined in claim 8 wherein the switch is a thermal switch activated by the heat developed as the lamp warms up.

10. A lamp as defined in claim 8 wherein the resistance of the filament portion retained in series circuit is not more than about ⅒ the equivalent arc tube resistance.

11. A lamp as defined in claim 9 wherein the resistance of the filament portion retained in series circuit is not more than about ⅒ the equivalent arc tube resistance.

References Cited
UNITED STATES PATENTS

| | | | |
|---|---|---|---|
| 2,020,737 | 11/1935 | Pivani et al. | 315—49 |
| 3,012,181 | 12/1961 | Schultz | 321—15 |

JERRY D. CRAIG, Primary Examiner

U.S. Cl. X.R.

315—179, 241